Patented Mar. 8, 1927.

1,620,409

UNITED STATES PATENT OFFICE.

OWEN PARKER SWIFT, OF HALIFAX, ENGLAND, ASSIGNOR TO CHADELOID CHEMICAL COMPANY, OF NEW YORK, N. Y., A CORPORATION OF WEST VIRGINIA.

PAINT AND VARNISH REMOVER.

No Drawing.   Application filed December 24, 1923. Serial No. 682,464.

This invention relates to paint and varnish removers and relates especially to compositions composed of a waxy body, a wax solvent and a wax precipitant. In which general respect it resembles removers now commonly used.

My invention however involves in its essential features a wax solvent composed of aromatic hydrocarbons having differing rates of volatility or evaporation tendencies. Thus for example I may employ a mixture of benzol and toluol, or of benzol, toluol and xylol or in some cases may employ the light oil distillate of crude benzol which contains mixtures of these several hydrocarbons. Preferably I employ as the wax solvent a mixture of benzol and toluol and I have found for this purpose that proportions of one volume of toluol to four volumes of benzol are useful.

The wax precipitant may be any alcoholic body miscible with benzol and toluol, for example ethyl or grain alcohol, denatured alcohol and various higher alcohols. In some cases methyl or wood alcohol may be employed, also various ketonic bodies such as acetone or methyl ethyl ketone.

One object of the present composition is to obtain a mixture having powerful penetrating and solvent qualities at a relatively low cost of manufacture. This excludes, except in small percentage, the relatively costly ketone solvents. Denatured alcohol affords the most satisfactory cheap source of alcoholic material.

I have found that by proportioning toluol and benzol in this manner a certain co-operative solvent action is secured in conjunction with the alcoholic or ketone body which increases the cutting speed or removing activity of the composition. This is especially noticeable with a cheap solvent such as denatured alcohol which is commonly available in 95 per cent strength and has a much slower cutting action than is the case with solvents such as acetone or methyl acetone. When admixed however with the benzol-toluol wax solvent the resulting solvent mixture shows a substantial increase in cutting speed over that found when benzol for example is used as the sole wax solvent. Furthermore benzol and toluol are cheaper solvents than alcohols and ketones and I find it possible to use a major proportion of the hydrocarbon solvents; in fact in the neighborhood of two-thirds of the entire bulk of the remover mixture of such hydrocarbons may be used resulting in diminishing the proportion of alcohols and ketones and a consequent reduction in cost.

This removing composition is much cheaper to make than compositions made up according to standard well-known formulas involving equal parts of benzol and acetone as the solvent vehicle, incorporated with a few per cent of wax. In spite of this lower cost, the removing composition made according to my invention has a cutting speed quite closely approximating that of the more expensive acetone compositions.

While mineral waxes such as paraffin or ceresin wax may be used in my composition I prefer to employ beeswax as this wax does not yield as greasy a surface as is the case with mineral waxes and hence there is no occasion for so much care in cleaning the surface before re-painting. Also there is not the same danger that any residue of beeswax will affect the drying of a subsequent coat of paint or varnish or cause such coating to peel.

In removing compositions now on the market it is customary to use only a small amount of wax, usually from 3 to 5 ounces of paraffin wax per gallon (i. e. about 2.5 to 4%). In making my composition I prefer to use a substantial proportion of wax (preferably larger than above), and find that although I am displacing solvent material in this manner nevertheless the presence of a substantial amount of wax affords the opportunity of reducing the proportion of alcohol to a considerable degree. This is highly desirable when making up special removing compositions for the treatment of certain surfaces. Hence I may use to advantage in some cases from 8 to 15 per cent of wax.

A removing composition illustrating my invention is made as follows: light coal tar distillate or crude benzol, containing at least 20 per cent of toluol, 20 gallons (i. e. about 5 to 10%), paraffin wax or beeswax 2½ gallons to 5 gallons, 90 per cent benzol 12 gallons, denatured alcohol, 95 per cent, 15 gallons.

In the foregoing formula the wax is expressed in gallons because it is my custom to first melt the wax and compound it with the other ingredients by volume mixture.

Another removing composition is made from benzol 26 gallons, toluol 6 gallons, beeswax 5 gallons, denatured alcohol 7½ gallons, methyl acetone 7½ gallons.

A stiffer removing composition may be secured by adding 10 gallons of denatured alcohol to the above composition.

A third formula is composed of molten beeswax 10 gallons, light oil of coal tar or crude benzol 60 gallons, denatured alcohol 30 gallons.

The components of the foregoing formula may be incorporated in any suitable manner, for example by melting the wax and adding the wax solvent and finally the wax precipitant, stirring during such additions. In the foregoing formulæ paraffin wax has been set forth as the equivalent of beeswax but it should be understood however that I do not regard these waxes as precise equivalents, both are capable of retarding evaporation of volatile solvents but the beeswax is superior in that it does not have the greasy qualities of the mineral wax.

I wish to add that the solvents employed herein are preferably of a miscible character in order to secure the highest degree of co-operative solvent action. The removing composition is preferably free from acid such as acetic acid or material of a corrosive nature such as carbolic acid, and in fact is preferably entirely neutral.

To recapitulate the present invention concerns a paint and varnish removing composition composed of wax, alcoholic bodies, with or without ketones, and a composite wax solvent preferably benzol admixed with a lesser proportion of toluol, a specific preferred ratio being one part of toluol to four parts of benzol by volume, the alcoholic body being preferably denatured alcohol, the softening effect of which may be quickened if desired by the addition of methyl acetone; the proportion of alcohol being preferably less than the wax solvent, a preferred formula involving about one-third by volume of alcohol to two-thirds of composite hydrocarbon solvent; the proportion of the wax used being preferably somewhat greater than that employed in ordinary liquid remover, preferably ranging from the two or three per cent of wax customarily employed up to fifteen or twenty per cent of wax; such high content of wax favoring reduction in alcohol content and a reduced rate of evaporation.

Finally I may add that a characteristic of removing compositions made under the foregoing procedure is that of remaining moist or having relatively slow evaporating tendencies thus permitting the composition to be applied to a resistant surface and allowed to remain over night when the softened finish may be readily removed. This quality of my removing composition is not shown by a great many removing compositions made from volatile solvents and so far as I know is exhibited by no others of comparable low cost and solvent activity.

What I claim is:—

1. A paint and varnish removing composition comprising wax, a relatively small volume of an alcoholic body and a relatively larger volume of wax solvent composed of approximately 4 volumes of benzol to 1 volume of toluol.

2. A paint and varnish removing composition comprising wax, a wax solvent consisting of benzol and toluol in the ratio of 4:1, denatured alcohol and acetone.

3. A paint and varnish remover as described comprising about two volumes of a 4:1 mixture of benzol and toluol and one volume of an alcoholic solvent, together with over 5% of a wax.

OWEN PARKER SWIFT.